US012456834B2

(12) United States Patent
Su et al.

(10) Patent No.: US 12,456,834 B2
(45) Date of Patent: Oct. 28, 2025

(54) ELECTRICAL PLUG CONNECTOR WITH RETENTION FEATURES

(71) Applicant: PLUME DESIGN, INC., Palo Alto, CA (US)

(72) Inventors: Ming-Tsung Su, Taipei (TW); Wang Chun Wen, Taoyuan (TW)

(73) Assignee: PLUME DESIGN, INC., Palo Alto, CA (US)

( * ) Notice: Subject to any disclaimer, the term of this patent is extended or adjusted under 35 U.S.C. 154(b) by 321 days.

(21) Appl. No.: 18/311,342

(22) Filed: May 3, 2023

(65) Prior Publication Data

US 2024/0372283 A1 Nov. 7, 2024

(51) Int. Cl.
*H01R 13/20* (2006.01)
*H01R 43/16* (2006.01)

(52) U.S. Cl.
CPC ............. *H01R 13/20* (2013.01); *H01R 43/16* (2013.01)

(58) Field of Classification Search
CPC ........ H01R 13/20; H01R 13/04; H01R 13/05; H01R 13/10; H01R 13/22; H01R 43/16
USPC .......................................................... 439/692
See application file for complete search history.

(56) References Cited

U.S. PATENT DOCUMENTS 1,064,833 A * 6/1913 Hubbell ................. H01R 33/94 439/646
2,643,362 A * 6/1953 Johansson .............. H01R 13/60 324/156
3,451,036 A * 6/1969 Boch ...................... H01R 13/20 439/465
4,657,333 A * 4/1987 Anderson .............. H01R 13/20 439/817
5,630,726 A * 5/1997 Baldwin .............. H01R 13/642 439/270
6,109,977 A * 8/2000 Baxter ................... H01R 13/04 439/518
6,267,627 B1 * 7/2001 Lin ........................ H01R 24/30 439/106
6,929,514 B1 * 8/2005 Chuang .................. H01R 31/02 439/652
7,029,332 B2 * 4/2006 Chien .................. H01R 13/684 439/106

(Continued)

OTHER PUBLICATIONS

International Search Report and Written Opinion to corresponding Int'l Appln. No. PCT/US24/27335 mailed Jul. 25, 2024 (8 pages).

*Primary Examiner* — Harshad C Patel
(74) *Attorney, Agent, or Firm* — Nicholas Martin; Greenberg Traurig, LLP

(57) ABSTRACT

An electrical plug connector may include a housing defined by a body, a first prong, and a second prong. The first prong includes a first portion and a second portion including a first recess located on the second portion. The second prong includes a third portion and a fourth portion including a second recess located on the fourth portion. Each of the first prong and second prong outwardly extend from an end of the housing. The first prong may also include a third recess located opposite the first recess and the second prong may also include a fourth recess located opposite the second recess. The recesses arranged on the first prong and second prong are configured to engage a contact member located in a corresponding receptacle of an electrical outlet to retain a position of the electrical plug connector in the electrical outlet and restrict movement in an axial direction.

17 Claims, 5 Drawing Sheets

(56) References Cited

U.S. PATENT DOCUMENTS

| | | | | |
|---|---|---|---|---|
| 7,259,975 | B2 * | 8/2007 | Holme Pedersen | H01R 13/6675 363/146 |
| 7,297,016 | B1 * | 11/2007 | Tymkewicz | H01R 24/28 439/459 |
| 7,922,540 | B2 * | 4/2011 | Zhang | H01R 24/28 439/106 |
| 9,142,911 | B1 * | 9/2015 | Kao | H01R 13/405 |
| 9,236,699 | B2 * | 1/2016 | Lai | H01R 13/665 |
| 9,461,401 | B2 * | 10/2016 | Kao | H01R 13/5845 |
| 10,256,571 | B2 * | 4/2019 | Chapel | H01R 13/187 |
| 10,673,186 | B2 * | 6/2020 | Gilliland | H01R 13/7175 |
| 2003/0207606 | A1 * | 11/2003 | Ho | H01R 13/20 439/346 |
| 2010/0035481 | A1 * | 2/2010 | Grieff | H01R 13/639 439/692 |
| 2010/0144194 | A1 * | 6/2010 | Umei | H05K 5/063 29/592.1 |
| 2016/0181725 | A1 | 6/2016 | Kao et al. | |

* cited by examiner

ELECTRICAL PLUG CONNECTOR WITH RETENTION FEATURES

FIELD

The present disclosure relates to the field of electrical plug connectors. More particularly, to an electrical plug connector with retention features.

BACKGROUND

Conventional electrical plug connectors have two or three prongs, where the prongs can be inserted into an electrical socket also having two or three receptacles, respectively. When the plug connector is inserted into the electrical socket, there is a possibility that the plug connector can partially fall out of the respective receptacles such that the prongs of the plug connector are exposed. In other scenarios, the plug connector can partially fall out of the respective receptacle and expose the prongs in response to tension being applied to the electrical connector or an electrical cable attached to the plug connector. Accordingly, when the prongs are exposed but still in electrical contact with the conductive contact member located in the respective receptacles, there is a risk of an electrical short and fire, which may cause damage to electrical equipment or structural members.

SUMMARY

The various embodiments of the present disclosure relate to a device, assembly, or system and method for manufacturing the same. In various embodiments, the device may be an electrical connector or electrical plug connector. The device includes a first prong and a second prong extending from an end of a housing. The first prong and the second prong each include at least one recess located on a side of the first prong and second prong. The at least one recess includes a surface that is stepped down from a surface of the side of the first prong and second prong. The first prong and second prong are configured to be inserted into a respective receptacle of an electrical outlet. Each respective receptacle includes a conductive contact member, and the first prong and second prong are inserted into the respective receptacle such that the conductive contact member, or a portion thereof, is positioned in the at the at least one recess of the respective first prong and second prong. By the contact member being positioned in the at least one recess, the contact member engages the respective first prong and second prong at the recess and partially restricts a movement of the respective first prong and second prong in an axial direction of the receptable. In this regard, the contact members provides a measure of mechanical interference which limits the withdrawal of the respective first prong and second prong until the mechanical interference is overcome by the withdrawal force applied to the electrical plug connector.

Different countries have different standards for the sizes, shapes, and dimensions of electrical plug connectors and similar standards for the dimensions of the corresponding electrical outlets and the receptacles located therein. Accordingly, in various embodiments of the present disclosure, the device may include a first prong and a second prong manufactured based on different specifications and based on varying tolerance standards. It is to be appreciated by those having ordinary skill in the art that the shape, size, and dimensions of the electrical connector are not intended to be limiting and the electrical connector may include any of a plurality of shapes, sizes, and dimensions in accordance with this disclosure and as will be further described herein.

In some embodiments, a device includes a housing defined by a body, a first prong including a first portion, and a second portion including a first recess, the first prong outwardly extends from an end of the housing, and a second prong including a third portion, and a fourth portion including a second recess, the second prong outwardly extends from the end of the housing adjacent the first prong.

In some embodiments, the first recess and second recess are configured to engage a respective first contact member and second contact member located in an electrical outlet to retain a position of the device in the electrical outlet.

In some embodiments, the second portion further includes a third recess, the third recess is located opposite the first recess on the first prong, and the fourth portion further includes a fourth recess, the fourth recess is located opposite the second recess on the second prong.

In some embodiments, the third recess and fourth recess are configured to further engage the respective first contact member and second contact member located in an electrical outlet.

In some embodiments, the first portion and the third portion each include a first thickness, the second portion and the fourth portion each include a second thickness, and the first thickness is greater than the second thickness.

In some embodiments, the first prong extends from an end of the housing along a first plane and the second prong extends from the end of the housing along a second plane substantially parallel to the first plane.

In some embodiments, the first portion and third portion on the respective first prong and second prong each include a flat member.

In some embodiments, the first prong is configured to be electrically connected with a first conductor and the second prong is configured to be electrically connected with a second conductor.

In some embodiments, a distal end of the first prong includes a first width and the distal end of the second prong includes a second width, the first width being greater than the a width of the first prong associated with the first recess and the third recess, the second width being greater than a width of the second prong associated with the second recess and the fourth recess.

In some embodiments, the body is formed around a portion of the first prong and second prong by injection molding.

In some embodiments, an electrical plug connector assembly is disclosed, which as provided herein, is similar to the disclosed device, discussed supra. In some embodiments, the electric plug connector assembly includes a housing, a first prong including a first recess, and a third recess opposite the first recess, the first prong extends from an end of the housing, a second prong including a second recess, and a fourth recess opposite the second recess, the second prong extends from the end of the housing adjacent the first prong, and the first recess and the second recess are located adjacent a distal end of the respective first prong and second prong opposite the housing.

In some embodiments, a method of manufacturing an electrical plug connector, the method includes forming one or more prongs for the electrical plug connector, punching a recess into a first side of the one or more prongs, and installing a first prong and a second prong into a housing such that the first prong and second prong outwardly extend from an end of a housing.

In some embodiments, the method further includes punching the recess into a second side of the one or more prongs opposite the recess on the first side.

In some embodiments, installing the first prong and second prong into the housing such that the first prong and second prong outwardly extend from the end of a housing further includes forming the housing around a portion of the first prong and second prong by injection molding such that the first prong and second prong outwardly extend from the end of the housing.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Figure 1:
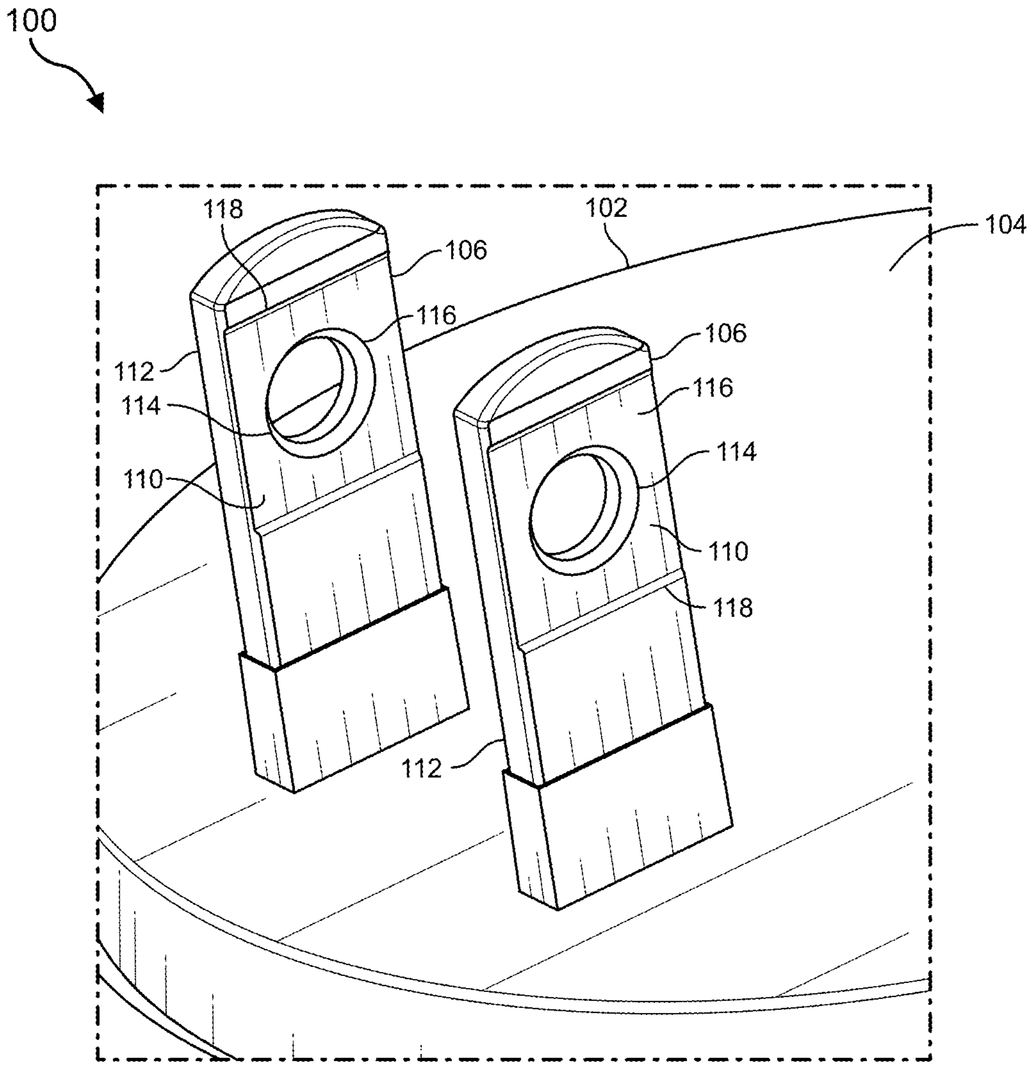
FIG. 1 is a perspective view of a non-limiting example of a device, according to some embodiments.

FIG. 1 illustrates a perspective view of a non-limiting example of a device 100, according to some embodiments. Device 100 includes a housing 102 defined by a body 104. Device 100 includes one or more prongs 106 extending from a surface of the housing 102. The device 100 may also include an electrical cable that extends into the housing 102 and connects to the one or more prongs 106. In some embodiments, the electrical cable may be located opposite the one or more prongs 106 on the housing 102. In other embodiments, the electrical cable may be located perpendicular to the one or more prongs 106. It is to be appreciated by those having ordinary skill in the art that the location of the electrical cable is not intended to be limiting and the electrical cable may extend into the housing 102 at any of a plurality of locations so long as the position does not interfere with the connection of the device 100 into an electrical outlet.

The electrical cable has a first end and a second end and includes one or more electrical conductors extending therethrough between the first and second end. For example, the electrical cable may include two insulated conductors or wires extending therethrough-a hot conductor and a neutral conductor. The one or more electrical conductors may connect to a respective one of the one or more prongs 106 inside the housing 102 at the first end. In some embodiments, the electrical cable may also include a male or female electrical plug connector at the second end that is configured to connect to an electrical device. For example, the electrical cable may include a female plug connector that is configured to be plugged into a receptacle located on the electrical device.

Figure 3:
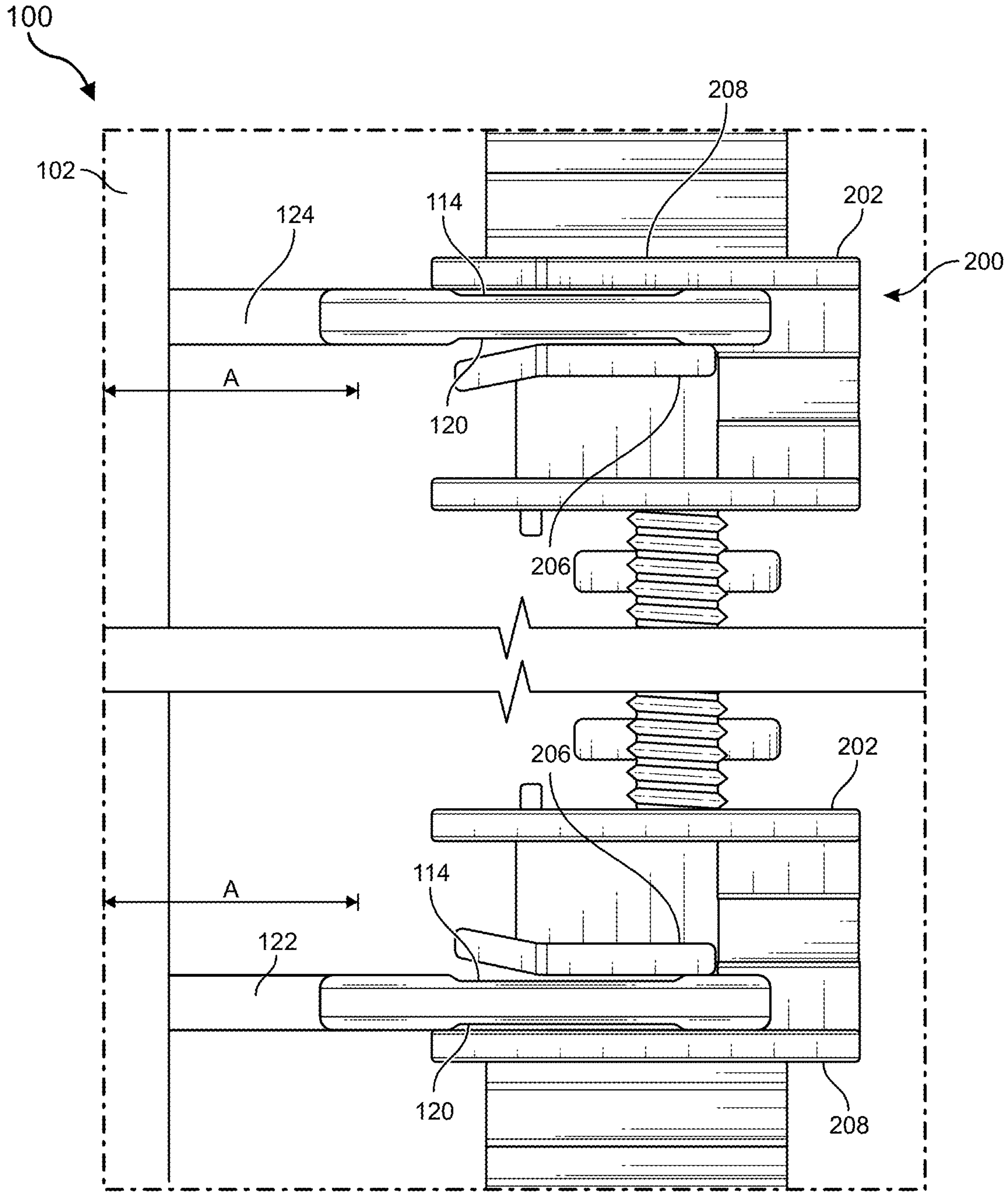
FIG. 3 is a top view of the device installed into an electrical outlet, according to some embodiments.

The one or more prongs 106 are configured to be inserted into corresponding receptacles located in an electrical outlet 200, such as shown in FIG. 3. When plugged into the corresponding receptacles, the one or more prongs 106 engage a contact member 202 located in the corresponding receptacle as will be further described herein. Additionally, the contact member 202 may be in electrical connection with a power source, such as to an electrical distribution panel connected to a power grid. Accordingly, the one or more prongs 106 contact the contact member 202 located in the corresponding receptacle, which places the device 100 and the one or more prongs 106 in electrical connection with the power source. Further, when the device 100 is also in connection with the electrical device, the electrical current may be supplied from the power source to power the electrical device.

The one or more prongs 106 each have a first side 110 and a second side 112 opposite the first side 110. The one or more prongs 106 also include a recess 114 formed along a length of the first side 110 located adjacent a distal end of the one or more prongs 106 opposite the housing 102. The recess 114 is defined by a surface 116 and two stepped sidewalls 118. The surface 116 extends on a plane that is substantially parallel to a plane of the first side 110. Additionally, the two stepped sidewalls 118 extends from the surface 116 to the first side 110, thereby forming a transitioned step to enable the contact member 202 to slidingly seat into and out of the recess 114 when the one or more prongs 106 is inserted into the respective receptacle.

The two stepped sidewalls 118 extend between the plane of the surface 116 and the plane of the first side 110. In some embodiments, the two stepped sidewalls 118 may perpendicularly extend between surface 116 and first side 110. In some embodiments, the two stepped sidewalls 118 may be substantially perpendicular to surface 116 and first side 110. In other embodiments, the two stepped sidewalls 118 may angularly extend between surface 116 and first side 110 such that the two stepped sidewalls 118 form an angular transition between surface 116 and first side 110. For example, the two stepped sidewalls 118 may form two angled transitions to case a transition for the contact member 202 sliding along a length of the one or more prongs 106 when the device 100 is withdrawn from the electrical outlet. In another example, the two stepped sidewalls 118 may be substantially perpendicular to surface 116 and first side 110 such as to provide an increased retention capability for the device 100 when the one or more prongs 106 is installed into corresponding receptacle of the electrical outlet.

The one or more prongs 106 include a portion 126 and a portion 128. The portion 126 is located adjacent the housing 102 relative to the portion 128. In some embodiments, the portion 126 may extend through the openings defined in the housing 102 to enable the one or more prongs 106 to connect to the electrical cable inside the housing 102. In some embodiments, the portion 126 may be connected to an electrical terminal (not shown) that is configured to couple to the electrical cable (e.g., hot conductor or neutral conductor). In other embodiments, the portion 126 may include a bore (not shown) extending therethrough that is configured to receive an electrical conductor (e.g., hot conductor or neutral conductor) inserted through the bore. The one or more prongs 106 also includes the portion 128, and the portion 128 includes recess 114 formed thereon.

In some embodiments, the distal end of the one or more prongs 106 opposite the housing 102 may have a rounded or arcuate profile. For example, the distal end of the one or more prongs 106 may include a concave shape. In other embodiments, the distal end of the one or more prongs 106 opposite the housing 102 may be substantially flat.

The device 100 includes one or more prongs 106 that extend from an end of the housing 102. In some embodiments, the one or more prongs 106 may include a first prong 122 and a second prong 124 which extend from the housing 102 of device 100. For example, the first prong 122 may be configured to electrically connect to a hot receptacle of the electrical outlet 200 and the second prong 124 may be configured to electrically connect to a neutral receptacle of the electrical outlet 200, or vice versa. Although not shown in the figures, in some embodiments, the device 100 may also include a third prong extending from the housing 102. The third prong may be a grounding prong for device 100 and any electrical device connected thereto to provide electrical grounding protection.

In some embodiments, and as shown in FIG. 1, the first prong 122 and the second prong 124 may have similar dimensions and features as the other of the first prong 122 and second prong 124. In other embodiments, the first prong 122 or the second prong 124 may also include distinct dimensions and features as compared to the other one of the first prong 122 and second prong 124. For example, a width of the first prong 122 may increase at the distal end as compared to the second prong 124 such that the device 100 may only be inserted into the electrical outlet in one orientation. It is to be appreciated by those having ordinary skill in the art that the dimensions and features of the first prong 122 and second prong 124 are not intended to be limiting and the first prong 122 and second prong 124 of device 100 may including any of a plurality of features in accordance with this disclosure.

As shown in FIG. 1, the first prong 122 and second prong 124 each include recess 114 on the first side 110, where the recess 114 on the respective first prong 122 and second prong 124 are facing the same direction. In some embodiments, the first prong 122 and second prong 124 may each include recess 114, where the recess 114 faces a similar direction. In other embodiments, the first prong 122 and second prong 124 may each include recess 114, where the recess 114 faces an opposite direction. For example, the recess 114 on the first prong 122 and second prong 124 may be exterior facing. In another example, the recess 114 on the first prong 122 and second prong 124 may be interior facing towards the recess 114 on the other one of the first prong 122 and second prong 124.

Figure 2:
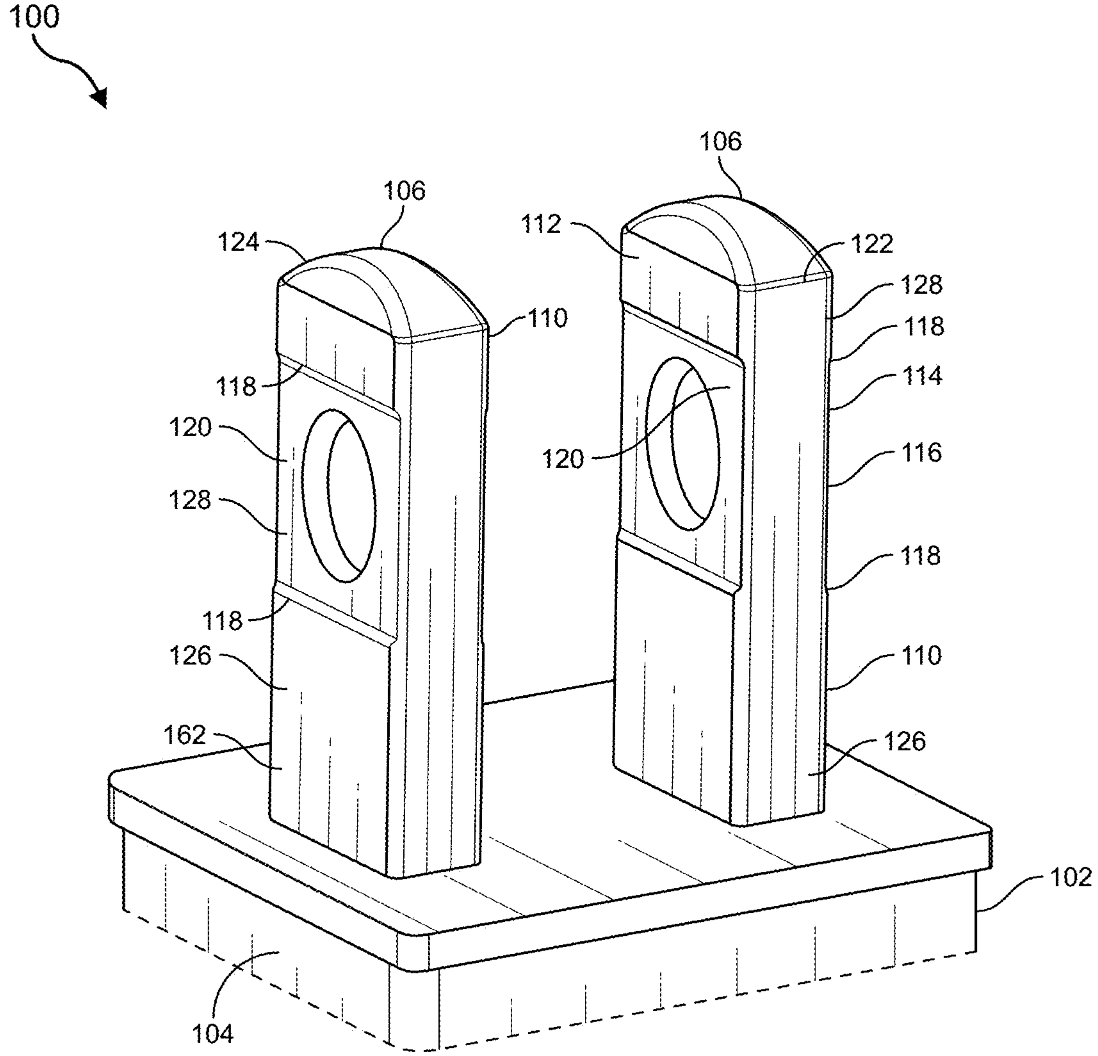
FIG. 2 is a second perspective view of the device, according to some embodiments.

FIG. 2 illustrates a second perspective view of the device 100, according to some embodiments. The one or more prongs 106 may further include a recess 120 located on the second side 112. In this regard, in some embodiments, the recess 114 may be a first recess and the one or more prongs 106 may also include a recess 120, e.g., second recess, located on the second side 112 opposite the recess 114 located on the first side 110. The recess 120 may include dimensions similar to the recess 114 located on the first side 110 as described herein.

The device 100 may include a first prong 122 and a second prong 124 that extend from the end of the housing 102. The first prong 122 and the second prong 124 extend from the end of the housing adjacent the other of the first prong 122 and second prong 124. In some embodiments, the first prong 122 and second prong 124 extend from a first opening 226 and a second opening 228, respectively. The first opening 226 and second opening 228 being defined by the housing 102 to enable the first prong 122 and second prong 124 to extend into an interior cavity of the housing 102.

At the housing 102, the first prong 122 and the second prong 124 are spaced a certain distance apart from the other. In some embodiments, the first prong 122 and the second prong 124 may be spaced approximately 12.7 mm apart. However, it is to be appreciated that the distance between the first prong 122 and the second prong 124 is not intended to be limiting and the distance may be smaller or greater in accordance with this disclosure.

The first prong 122 and second prong 124 each include the portion 126 adjacent the housing 102 and the portion 128 adjacent the distal end. In some embodiments, each of the first prong 122 and second prong 124 include portion 126 and portion 128. In some embodiments, for the first prong 122, the portion 126 may be referred to as a first portion and the portion 128 may be referred to as a second portion. Additionally, in some embodiments, for the second prong 124, the portion 126 may be referred to as a third portion and the portion 128 may be referred to as a fourth portion.

The first prong 122 and second prong 124 each include recess 114 on the first side 110 and the recess 120 on the second side 112 opposite the recess 114. In some embodiments, for the first prong 122, the recess 114 may be referred to as a first recess and the recess 120 may be referred to as a third recess. Additionally, in some embodiments, for the second prong 124, the recess 114 may be referred to as a second recess and the recess 120 may be referred to as a fourth recess. However, it is to be appreciated by those having ordinary skill in the art that each of the first prong 122 and the second prong 124 of device 100 are not intended to be limiting and may include recess 114, recess 120, or both. For example, first prong 122 may include recess 114 and second prong 124 may include the recess 114 and recess 120.

The recess 114 and the recess 120 may be formed adjacent a distal end of the first prong 122 and second prong 124. In some embodiments, the recess 114 and the recess 120 may be punched into the corresponding sides of the first prong 122 and second prong 124. The first prong 122 and second prong 124 may also include a bore extending therethrough adjacent the distal end. Further, recess 114 and recess 120 may be formed on the respective sides such that the bore is centrally located on the surface 116 of recess 114 and recess 120. It is to be appreciated that the process for forming the one or more prongs 106, the first prong 122, the second prong 124, the recess 114, the recess 120, or the bore is not intended to be limiting and may be formed by any of a plurality of processes including, but not limited to, punching, drilling, machining, welding, soldering, CNC, additive manufacturing, other processes, or any combinations thereof in accordance with this procedure.

The first prong 122 and second prong 124 extend from the same end of the housing 102. Additionally, the first prong 122 extends from the housing 102 on a first plane and the second prong 124 extends from the housing 102 on a second plane. In some embodiments, the first prong 122 and second prong 124 may extend from the housing 102 on respective planes that are parallel relative to the other. In some embodiments, the first prong 122 and second prong 124 may extend from the housing 102 on respective planes that are substantially parallel relative to the other. In other embodiments, the first prong 122 and second prong 124 may extend from the housing 102 on respective planes that are non-parallel to the other. For example, a distance between the first prong 122 and second prong 124 may gradually increase as the first prong 122 and second prong 124 extend away from the housing 102 towards the distal end. In another example, the first prong 122 and second prong 124 may extend from the housing 102 such that a distance between the first prong 122 and second prong 124 as measured at the housing 102 is greater at one end as compared to the other.

FIG. 3 illustrates a non-limiting example of the device 100 installed into an electrical outlet 200, according to some embodiments. The electrical outlet 200 may include a first receptacle and a second receptacle. Additionally, the device 100 is configured to be inserted into corresponding receptacles of the electrical outlet 200. In this regard, as shown in FIG. 3, the first prong 122 is configured to be inserted into the first receptacle and the second prong 124 is configured to be inserted into the second receptacle. In some embodiments, the first prong 122 may be configured to be inserted into the second receptacle and the second prong 124 may be configured to be inserted into the first receptacle. It is to be appreciated that unless the opening of the corresponding receptacle is sized to prevent one of the first prong 122 or the second prong 124 from being inserted through the opening of the receptacle, the orientation of the device 100 is not intended to be limiting may be inserted in any configuration.

Each of the first and second receptacles include a contact member 202 located therein. The contact member 202 engages the first prong 122 or the second prong 124 by applying a compressive force onto the first prong 122 and second prong 124 when the first prong 122 and second prong 124 is inserted into the contact member 202. The contact member 202 engages the recess 114, recess 120, or both, such that the two stepped sidewalls 118 of the recess 114 or recess 120 act in cooperation with the contact member 202 to interfere with the withdrawal of the first prong 122 and second prong 124 from the electrical outlet 200 until the force being applied to withdraw the device 100 overcomes the mechanical interference provided by the contact member 202 interacting with the recess 114 and recess 120.

The contact member 202 also includes arm 206 and arm 208. The contact member 202 may be a tensioning member that is configured to receive one of the first prong 122 and second prong 124 between the arm 206 and arm 208. Additionally, at least one of the arm 206 and arm 208 may be configured to engage the respective one of the recess 114 or recess 120 to retain a position of the first prong 122 or second prong 124. In some embodiments, the arm 206 may engage the recess 114 on the first prong 122 or the second prong 124. In other embodiments, the arm 208 may engage the recess 120 on the first prong 122 or the second prong 124.

In some embodiments, the arm 206, the arm 208, or both arm 206 and arm 208 may be configured to be seated into a corresponding recess when the first prong 122 or second prong 124 is inserted into the electrical outlet 200. As such, and as shown in FIG. 3, the first prong 122 extends into the first receptacle and the arm 206 is seated in the recess 114 to enable the contact member 202 to engage the first prong 122 at the recess 114. Additionally, the second prong 124 extends into the second receptacle and the arm 206 is seated in the recess 120 to enable the contact member 202 to engage the second prong 124 at the recess 120. Accordingly, the contact member 202 in each of the first receptacle and second receptacle acts on the respective one of the first prong 122 and second prong 124 inserted therein to retain the position of the first prong 122 and second prong 124 and to restrict movement of the device in the axial direction A when the contact member 202 engages the first prong 122 or second prong 124 at its respective recesses. Furthermore, the contact member 202 provides a measure of mechanical interference which limits the withdrawal of the device 100 and the corresponding one of the first prong 122 and second prong 124 from the receptacle until the withdrawal force applied to the device 100 overcomes the mechanical interference provided by the contact member 202 being seated in the recess 114, the recess 120, or both.

Additionally, the contact member 202 and the contact member 202 are in electrical connection with a power source such as through an electrical conductor. The electrical conductor is connected to each contact member 202 of the first and second receptacles and places the contact member 202 in electrical connection with the power source, such as through an electrical distribution panel of a facility. In some embodiments, the electrical conductor may include two or more conductors located therein that are connected to a respective contact member 202 in the first receptacle and second receptacle. In some embodiments, the electrical conductor includes a hot conductor and a neutral conductor. In some embodiments, the electrical conductor may also include a grounded conductor located therein that is in connection with a contact member 202 located in a third receptacle.

The contact member 202 is in electrical connection with the power source such that when the device 100 is plugged into the electrical outlet 200, electrical current is supplied from the power source to the device 100 through the contact member 202 of the electrical outlet 200. Accordingly, the device 100 is configured to place an electrical device in electrical connection with the power source so that electrical current may flow to the electrical device through the electrical outlet 200 and through the device 100 located therebetween.

Figure 4:
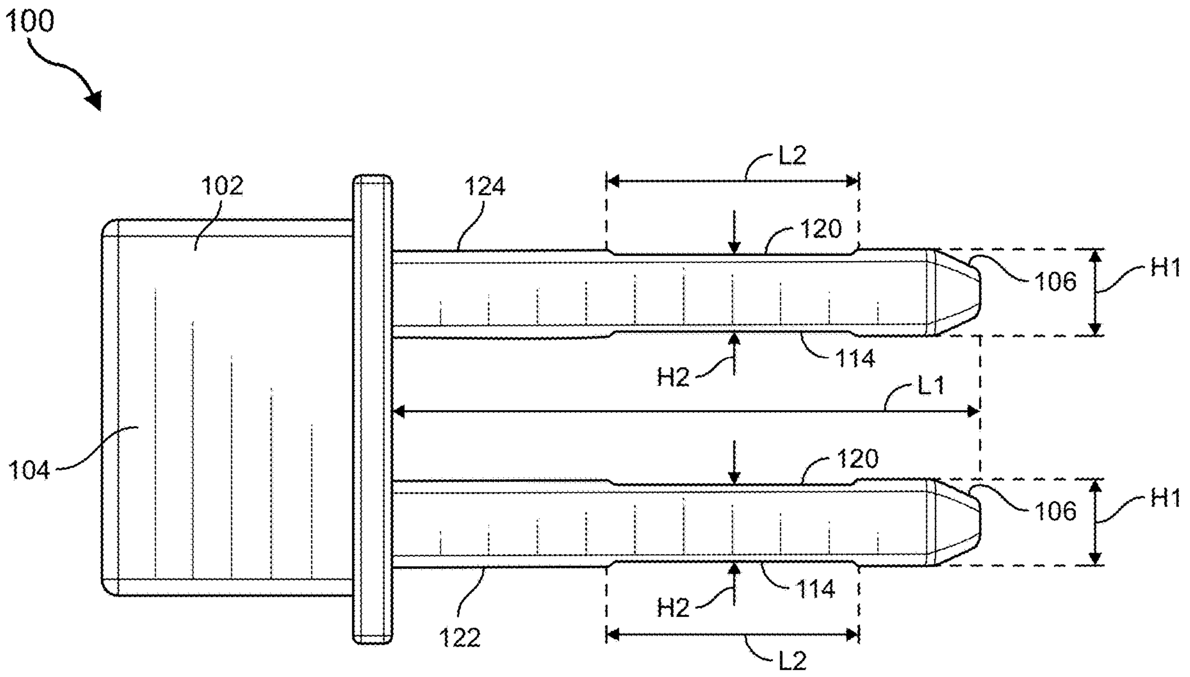
FIG. 4 is a side view of the device, according to some embodiments.

FIG. 4 illustrates a side view of the device 100, according to some embodiments. The one or more prongs 106 include the portion 126 and the portion 128, the portion 126 having a first thickness H1 and the portion 128 having a second thickness H2, where the first thickness H1 is greater than the second thickness H2. For example, the portion 126 may have a thickness of 1.58 mm and the portion 128 between the recess 114 and recess 120 may have a thickness of 1.42 mm. Accordingly, the recess 114 and recess 120 are stepped down from the respective first side 110 and second side 112 by 0.16 mm as a result of being formed into the first side 110 and second side 112, respectively.

The one or more prongs 106 also include a certain length L1 that extends from the housing 102. In some embodiments, each of the one or more prongs 106 that extend from the housing 102 may be substantially similar length. In other embodiments, each of the one or more prongs 106 may be different lengths. For example, the first prong 122 may be a first length and the second prong 124 may be a second length, where the first length is greater than the second length. In another example, the second length may be greater than the first length.

The recess 114 and the recess 120 are arranged on each of the one or more prongs 106 and have a length L2. In some embodiments, the length L2 of the recess 114 and recess 120 may be such that the contact member 202 and the corresponding arm 206 and arm 208 may be positioned into the recess 114 or recess 120, respectively, such that the arm 206 and arm 208 contacts the surface 116 and the one or more prongs 106 and the contact member 202 act in cooperation to restrict the movement of the one or more prongs 106 in the axial direction. As such, the length of the recess 114 and recess 120 may be greater than a length of the arm 206, the arm 208, or both, to enable the contact member 202 to engage the one or more prongs 106.

The one or more prongs 106 (e.g., first prong 122 and second prong 124) may be flat blade members. In some embodiments, the one or more prongs 106 may each be substantially planar members. In other embodiments, the one or more prongs 106 may be cylindrically shaped prong members. For example, the device 100 may include a grounded prong that includes a cylindrical shape.

It is to be appreciated by those having ordinary skill in the art that the physical dimensions and the shape of each of the one or more prongs 106 is not intended to be limiting and may include any of a plurality of different lengths, widths, thicknesses, shapes, or any combinations thereof, in accordance with this disclosure so long as the device 100 is capable of being inserted into corresponding receptacles in an electrical outlet and being placed in electrical connection with the power source and the one or more prongs 106 are capable of engaging the contact member 202 in the corresponding receptacles to restrict an axial movement of the device 100 and the one or more prongs 106.

Figure 5:
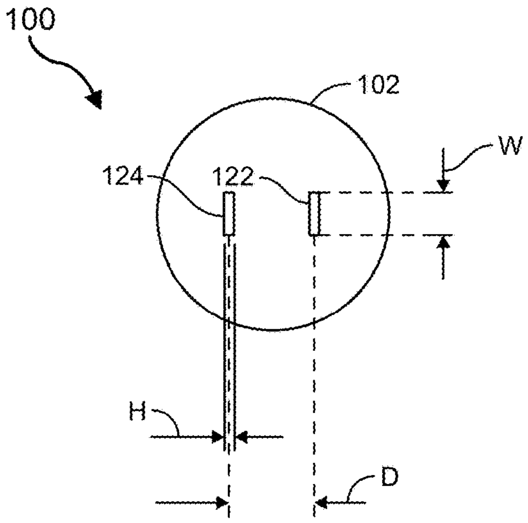
FIG. 5 is a front view of the device, according to some embodiments.
Figure 6:
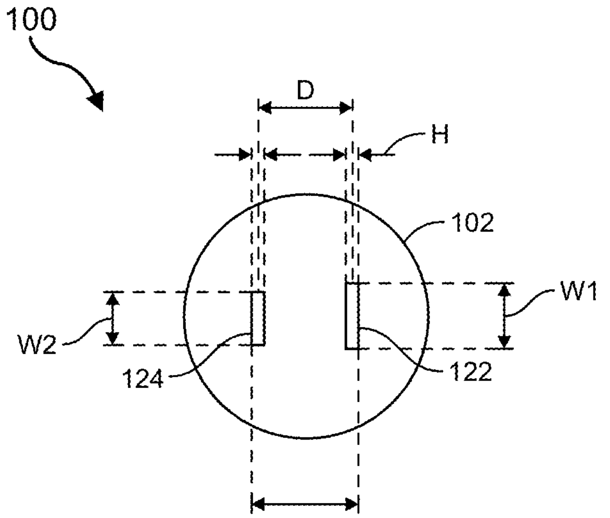
FIG. 6 is a front view of another non-limiting example of the device, according to some embodiments.

FIG. 5 illustrates a front view of a non-limiting example of the device 100, according to some embodiments. FIG. 6 illustrates a front view of another non-limiting example of the device 100, according to some embodiments. Unless specifically references, FIGS. 5 and 6 will be described collectively.

Different countries may have differing standards for the size, shape, and dimensions of the first prong 122 and second prong 124 of device 100. Similar standards may also establish the dimensions of the corresponding electrical outlets that may be used in those countries, such as, for example, electrical outlet 200. Accordingly, it is to be appreciated by those having ordinary skill in the art that the physical dimensions of the device 100 and the one or more prongs 106 of device 100 are not intended to be limiting and may include any of a plurality of physical dimensions and accordingly may also include differing shapes, sizes, and other features in accordance with the present disclosure. Additionally, it is to be appreciated by those having ordinary skill in the art that the device 100 may be manufactured according to the different tolerance standards for the physical dimensions of device 100 and in accordance with the present disclosure.

As shown in FIG. 5, the first prong 122 and second prong 124 may be members having similar physical dimensions as the other one of the first prong 122 and second prong 124. The first prong 122 and second prong 124 may each have a similar width W and thickness H as the other. Additionally, the first prong 122 and the second prong 124 may be spaced a certain distance D apart from the other of the first prong 122 and second prong 124. The first prong 122 and the second prong 124 may extend from the end of the housing 102 along respective planes that are substantially parallel. For example, the first prong 122 and second prong 124 may be flat blades measuring approximately 6.35 mm wide, 1.524 mm thick, and between 15.875 and 18.256 mm long, and the first prong 122 and second prong 124 may be spaced approximately 12.7 mm apart. In other embodiments, the first prong 122 and second prong 124 may extend from the housing 102 along respective planes that are not parallel.

As shown in FIG. 6, the first prong 122 and second prong 124 may be members having different physical dimensions from the other one of the first prong 122 and second prong 124. The first prong 122 may include a first width W1 and the second prong 124 may include a second width W2 different from the first width W1. The first width W1 of the first prong 122 may be wider than the second width W2 of the second prong 124. In some embodiments, the first width W1 of the first prong 122 may be narrower than the width W2 of the second prong 124. For example, the first prong 122 may be a flat blade measuring approximately 7.9 mm wide, 1.5 mm thick, and between 15.9 and 18.3 mm long, and the second prong 124 may be a flat blade measuring approximately 6.3 mm wide, 1.5 mm thick, and between 15.9 and 18.3 mm long, and the first prong 122 and second prong 124 may be spaced 12.7 mm apart, such that the first prong 122 and the second prong 124 may only be inserted into an electrical outlet 200 having corresponding dimensions at the respective receptacle openings in one orientation. It is to be appreciated by those having ordinary skill in the art that the dimensions of the first prong 122 and the second prong 124 are not intended to be limiting and the first prong 122 and second prong 124 may each include the same dimensions, substantially similar dimensions, and/or different dimensions relative to the other of the first prong 122 and second prong 124 and in accordance with this disclosure.

Figure 7:
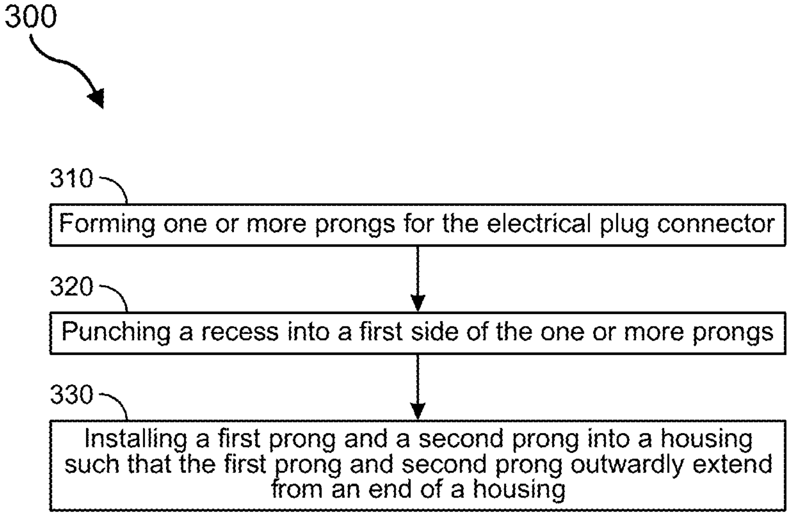
FIG. 7 illustrates a flow chart of a method, according to some embodiments.

FIG. 7 illustrates a flow chart of a method 300, according to some embodiments. The method 300 relates to manufacturing an electrical plug connector, such as device 100 as shown in FIG. 1. The method 300 includes, at 310, forming the one or more prongs 106 for the device 100. In some embodiments, forming the one or more prongs 106 includes forming a portion 126 and portion 128 on the one or more prongs 106. The portion 126 is configured to be positioned adjacent a housing 102 of device 100 and the portion 128 is configured to be positioned adjacent a distal end opposite the housing 102. In some embodiments, forming the one or more prongs 106 may include forming a first prong 122 and forming a second prong 124, each of the first prong 122 and second prong 124 configured to be installed into a housing 102 of device 100 such that the first prong 122 and second prong 124 outwardly extend from the housing 102.

At 320, the method 300 includes punching a recess 114 into a first side 110 of the one or more prongs 106. In some embodiments, the recess 114 may be punched into the portion 128 at the first side 110 of the one or more prongs 106. In some embodiments, the method 300 may also include punching a recess 120 into a second side 112 of the one or more prongs 106 opposite the recess 114.

In some embodiments, the one or more prongs 106 may include a bore that extends through the thickness of the one or more prongs 106. The bore may be centrally disposed along a surface 116 of the recess 114 and/or the recess 120. In this regard, in some embodiments, the method 300 may include forming the bore to extend through the one or more prongs 106 adjacent the distal end such that the recess 114 and/or the recess 120 is located around the bore when the recess 114 and recess 120 is punched into the one or more prongs 106.

At 330, the method 300 includes installing a first prong 122 and a second prong 124 into a housing 102 such that the first prong 122 and second prong 124 outwardly extend from an end of the housing 102. In some embodiments, the first prong 122 and second prong 124 may be coupled to an electrical cable, or to the conductors located within the electrical cable, prior to the housing 102 being formed around the first prong 122 and second prong 124, such that the housing 102 is formed around the first prong 122, the second prong 124, and the electrical cable. In other embodiments, the housing 102 may include a first member and a second member and the first member may be configured to be attached to the second member by one or more fasteners such that the housing 102 is disposed around a portion of the first prong 122 and second prong 124 such that they extend from the housing 102 and such that an electrical cable may be connected to the first prong 122 and second prong 124 inside the housing 102. It is to be appreciated that the one or more fasteners is not intended to be limiting and may include any of a plurality of fasteners including, but not limited to, screws, bolts, nuts, clips, rivets, adhesives, brackets, hinges, other fasteners, or any combinations thereof.

In some embodiments, installing the first prong 122 and second prong 124 into the housing 102 such that the first prong 122 and second prong 124 outwardly extend from the end of the housing 102 further includes forming the housing 102 around a portion of the first prong 122 and second prong 122 by an injection molding process such that the first prong 122 and second prong 124 outwardly extend from the end of the housing 102. In this regard, the housing 102 may be composed of an injection moldable plastic material capable of being formed using an injection molding process. In some embodiments, the body 104 is formed around a portion of the first prong 122 and second prong 124 by injection molding.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device comprising:
a housing defined by a body;
a first prong comprising:
a first portion, and
a second portion comprising:
a first recess,
wherein the first prong outwardly extends from an end of the housing; and
a second prong comprising:
a third portion, and
a fourth portion comprising:
a second recess,
wherein the second prong outwardly extends from the end of the housing adjacent the first prong.

2. The device of claim 1, wherein the first recess and second recess are configured to engage a respective first contact member and second contact member located in an electrical outlet to retain a position of the device in the electrical outlet.

3. The device of claim 1, wherein the second portion further comprises:
a third recess,
wherein the third recess is located opposite the first recess on the first prong; and
wherein the fourth portion further comprises:
a fourth recess,
wherein the fourth recess is located opposite the second recess on the second prong.

4. The device of claim 3, wherein the third recess and fourth recess are configured to further engage the respective first contact member and second contact member located in an electrical outlet.

5. The device of claim 3, wherein the first portion and the third portion each comprise a first thickness;
wherein the second portion and the fourth portion each comprise a second thickness; and
wherein the first thickness is greater than the second thickness.

6. The device of claim 1, wherein the first prong extends from an end of the housing along a first plane and the second prong extends from the end of the housing along a second plane substantially parallel to the first plane.

7. The device of claim 1, wherein the first portion and third portion on the respective first prong and second prong each comprise a flat member.

8. The device of claim 1, wherein the first prong is configured to be electrically connected with a first conductor and the second prong is configured to be electrically connected with a second conductor.

9. The device of claim 1, wherein a distal end of the first prong comprises a first width and the distal end of the second prong comprises a second width, the first width being greater than the width of the first prong associated with the first recess and the third recess, the second width being greater than a width of the second prong associated with the second recess and the fourth recess.

10. The device of claim 1, wherein the body is formed around a portion of the first prong and second prong by injection molding.

11. An electrical plug connector assembly comprising:

a housing;

a first prong comprising:

a first recess, and a third recess opposite the first recess, wherein the first prong extends from an end of the housing;

a second prong comprising:

a second recess, and a fourth recess opposite the second recess, wherein the second prong extends from the end of the housing adjacent the first prong; and wherein the first recess and the second recess are located adjacent a distal end of the respective first prong and second prong opposite the housing.

12. The electrical plug connector assembly of claim 11, wherein the first recess and third recess are configured to engage a first contact member of an electrical outlet, and the second recess and fourth recess are configured to engage a second contact member of the electrical outlet to retain a position of the electrical plug connector in the electrical outlet.

13. The electrical plug connector assembly of claim 11, wherein each of the first prong and second prong comprise a first thickness;

wherein a distance between the first recess and third recess and the distance between the second recess and fourth recess each comprise a second thickness; and wherein the first thickness is greater than the second thickness.

14. The electrical plug connector assembly of claim 11, wherein the first prong extends from an end of the housing along a first plane and the second prong extends from the end of the housing along a second plane adjacent the first plane; and wherein the first plane and the second plane are substantially parallel.

15. The electrical plug connector assembly of claim 11, wherein each of the first prong and the second prong comprise a substantially flat member.

16. The electrical plug connector assembly of claim 11, wherein the first prong is configured to be electrically connected with a first conductor and the second prong is configured to be electrically connected with a second conductor.

17. The electrical plug connector assembly of claim 11, wherein a distal end of the first prong comprises a first width and the distal end of the second prong comprises a second width, the first width being greater than the width of the first prong associated with the first recess and the third recess, the second width being greater than a width of the second prong associated with the second recess and the fourth recess.

* * * * *